United States Patent [19]

Maltais et al.

[11] Patent Number: 4,612,537

[45] Date of Patent: Sep. 16, 1986

[54] ALARM SYSTEM FOR MONITORING THE TEMPERATURE OF A LIQUID CONTAINED IN A RESERVOIR

[75] Inventors: André Maltais, Délisle; André Nadeau, Beloeil, both of Canada

[73] Assignee: Maritonex Inc., Quebec, Canada

[21] Appl. No.: 695,186

[22] Filed: Jan. 28, 1985

[51] Int. Cl.⁴ .......................... G08B 19/00; A01J 9/04
[52] U.S. Cl. .................................. 340/596; 119/14.09
[58] Field of Search ........... 340/596, 584, 585, 870.04, 340/870.09, 521, 648; 374/141, 188, 183; 366/145, 282; 119/14.09, 14.14; 99/453

[56] References Cited

U.S. PATENT DOCUMENTS

| | | | |
|---|---|---|---|
| 3,022,766 | 2/1962 | McKinley | 119/14.14 |
| 3,960,011 | 6/1976 | Renz et al. | 340/521 X |
| 4,321,860 | 3/1982 | Hazen | 99/453 |
| 4,506,218 | 3/1985 | Brown et al. | 340/648 X |
| 4,536,851 | 8/1985 | Germanton et al. | 374/183 X |

OTHER PUBLICATIONS

Sedra, et al., *Microelectronic Circuits*, Holt, Rinehart & Winston, N.Y., 1982, pp. 183 and 184.

*Primary Examiner*—James L. Rowland
*Assistant Examiner*—Anne Marie F. Capati
*Attorney, Agent, or Firm*—Oblon, Fisher, Spivak, McClelland & Maier

[57] ABSTRACT

An alarm system and method for monitoring the temperature of a liquid contained in a reservoir. The system comprises a temperature sensing probe for sensing the temperature of the liquid. A sensing circuit is associated with the probe to generate a temperature indicating signal representative of the liquid temperature. A calibration circuit is provided for calibrating the temperature signal relative to a reference signal. Converter means is provided to convert the calibrated temperature signal to a binary signal indicative of sensed temperatures of the liquid whereby to feed comparator circuits having preset limit detectors to initiate an alarm signal when the temperature signal exceeds a predetermined value. The comparator circuits also feed a display device to indicate the temperature of the liquid.

5 Claims, 5 Drawing Figures

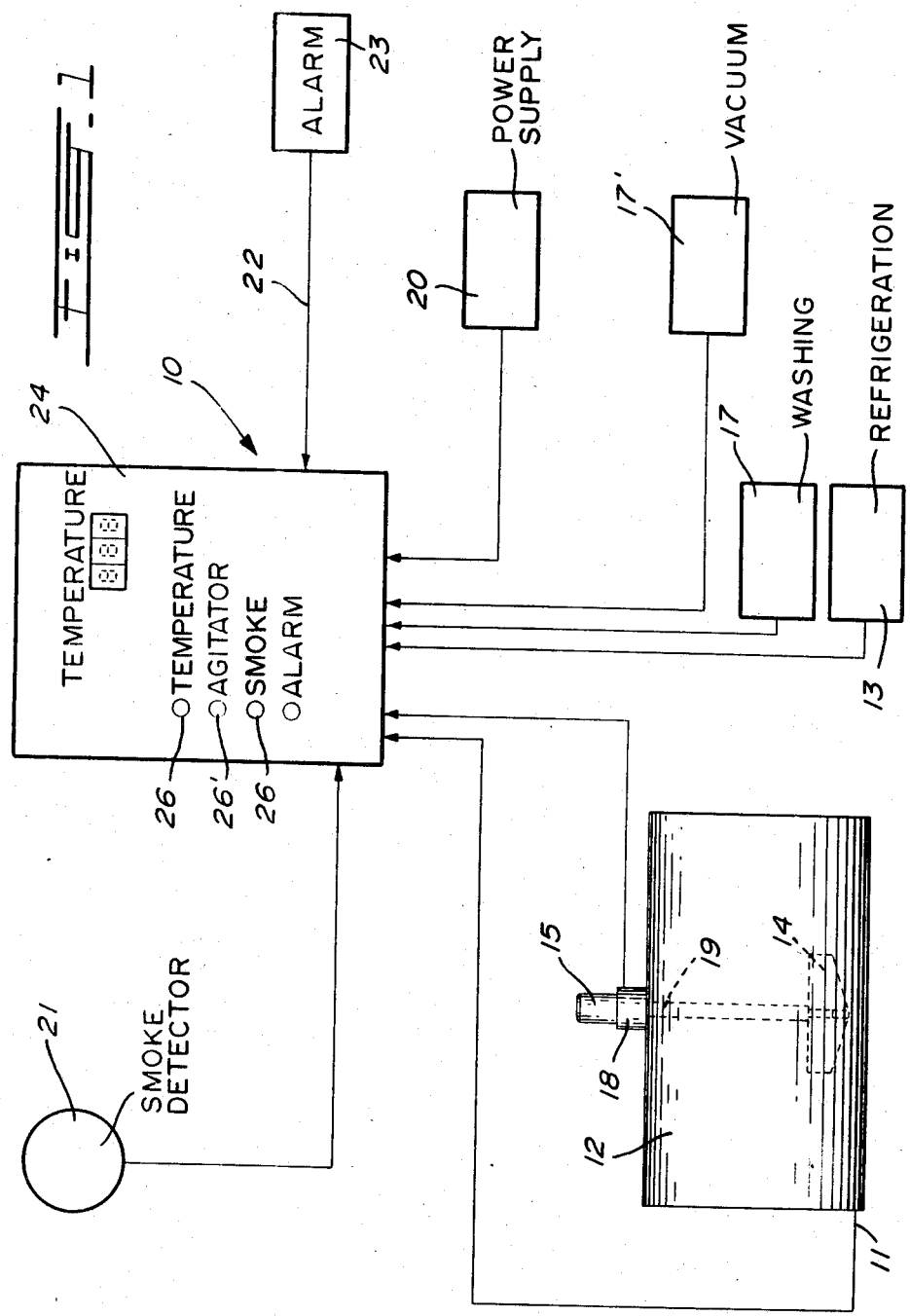

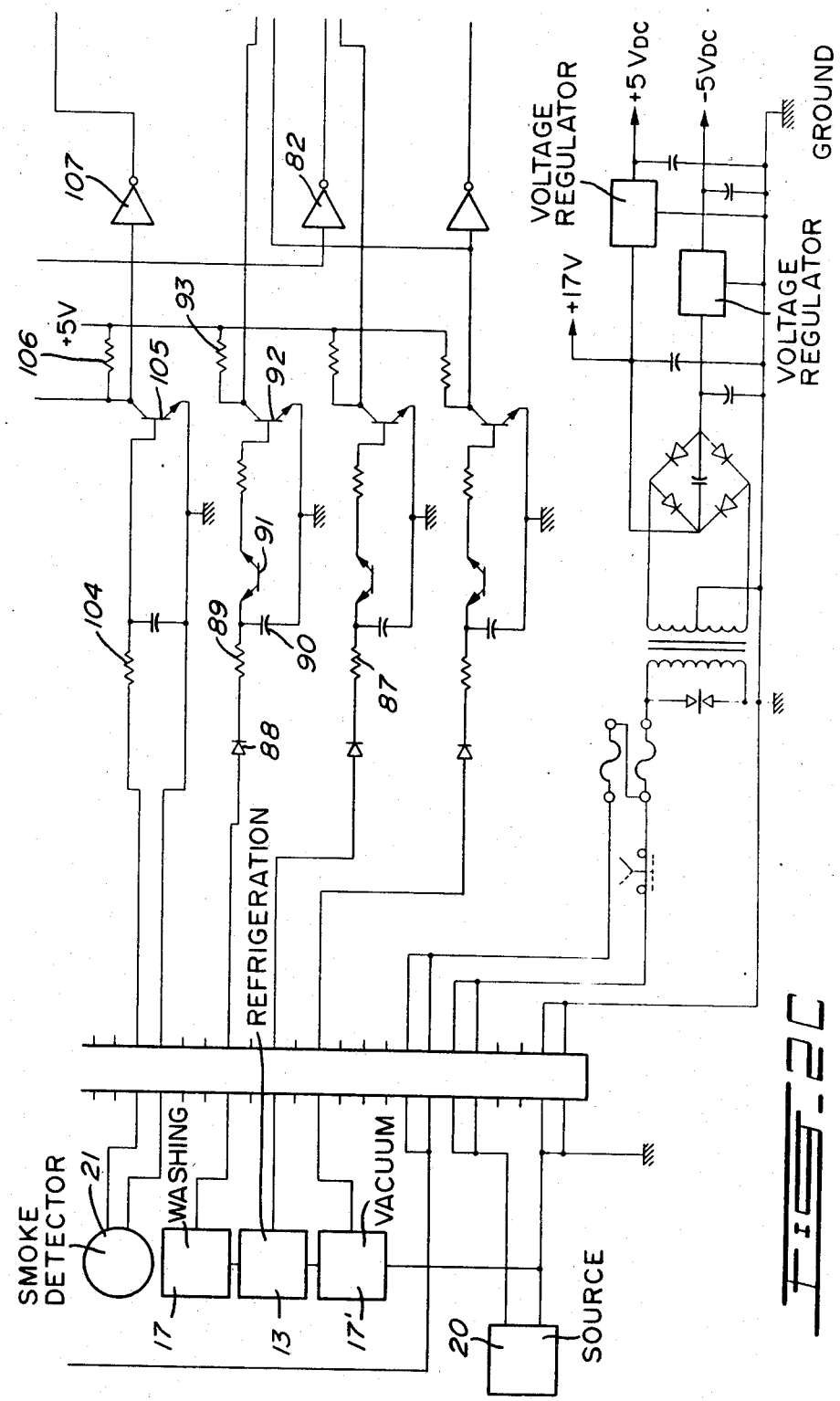

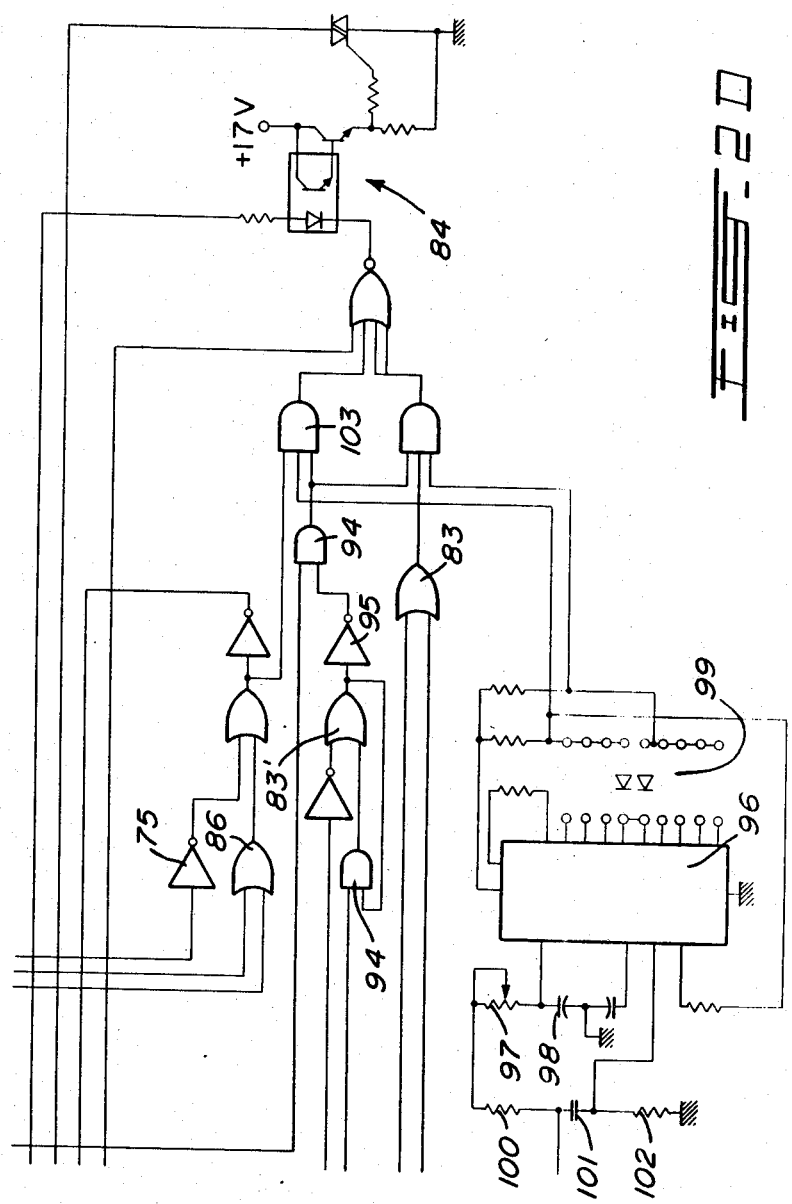

ALARM SYSTEM FOR MONITORING THE TEMPERATURE OF A LIQUID CONTAINED IN A RESERVOIR

BACKGROUND OF INVENTION (a) Field of the Invention

The present invention relates to an alarm system for use in monitoring the temperature of a liquid, herein milk, contained in a storage reservoir, and wherein the system further provides a display of the temperature of the liquid and being capable of monitoring equipment and detectors associated with the storage container or the environmental area of the container.

(b) Description of Prior Art

It is well known that when storing certain liquids, such as milk, it is essential to maintain the liquid within certain temperature ranges in order to prevent degradation or contamination of the liquid by bacteria growth. In order to do this, the container is usually refrigerated and a temperature probe or thermometer is conveniently secured to the reservoir to indicate the temperature of the liquid. However, it is not possible to continuously monitor this temperature or the working conditions of other devices associated with the reservoir, such as the agitator, motors, the refrigeration system, etc. as it is labor intensive. Consequently, it often occurs that the entire content of the reservoir must be discarded when the liquid has exceeded certain temperatures caused by equipment malfunctions. Also, food and drug administration guidelines are quite stringent and close tolerances must be observed.

SUMMARY OF INVENTION

It is therefore a feature of the present invention to provide an alarm system capable of monitoring the temperature of a liquid contained within a refrigerated reservoir and provide a continuous display thereof, and initiate an alarm when the temperature exceeds predetermined set temperature limits.

Another feature of the present invention is to provide a method of monitoring the temperature of a liquid contained in a refrigerated reservoir and to initiate alarms when the temperature exceeds preset temperature limits.

Another feature of the present invention is to provide an alarm system also capable of monitoring various devices associated with a refrigerating reservoir containing a liquid therein.

According to the above features, from a broad aspect, the present invention provides an alarm system and method for monitoring the temperature of a liquid contained in a reservoir. The system comprises a temperature sensing probe secured to the reservoir for sensing the temperature of the liquid and connected to an input of the system. A sensing circuit is associated with the probe to generate a temperature indicating signal representative of the liquid temperature. A calibration circuit is provided for calibrating the temperature signal relative to a reference signal. Converter means is provided to convert the calibrated temperature signal to a binary signal indicative of sensed temperatures of the liquid whereby to feed comparator circuits having preset limit detectors to initiate an alarm signal, to an alarm circuit, when the temperature signal exceeds a predetermined value. The comparator circuits also feed a display device to indicate the temperature of the liquid.

BRIEF DESCRIPTION OF DRAWINGS

A preferred embodiment of the present invention will now be described with reference to the example thereof as illustrated in the accompanying drawings in which:

FIG. 1 is a block diagram showing the various circuits connected to the alarm system of the present invention; and FIGS. 2A to 2D are sections of a detail schematic diagram of the alarm system of the present invention.

Referring to FIG. 1, there is shown generally at 10 the alarm system of the present invention. This system is connected to a temperature sensing probe 11 which is secured to an inner shell (not shown) of a refrigerated storage tank or reservoir 12 to sense the temperature of the liquid therein. A liquid, herein milk, is contained within the reservoir 12 which is refrigerated by a refrigeration device 13. The liquid is also maintained agitated by an agitator 14 which is driven by a motor 15. A movement detecting probe 16 detects whether the motor 15 is operative or not. The probe comprises a magnetic switch wherein the magnet element (not shown) is mounted on the motor shaft 18 and feeds a hall-effect switch 19, as will be described later with reference to FIGS. 2A-2D.

Figure 2A:
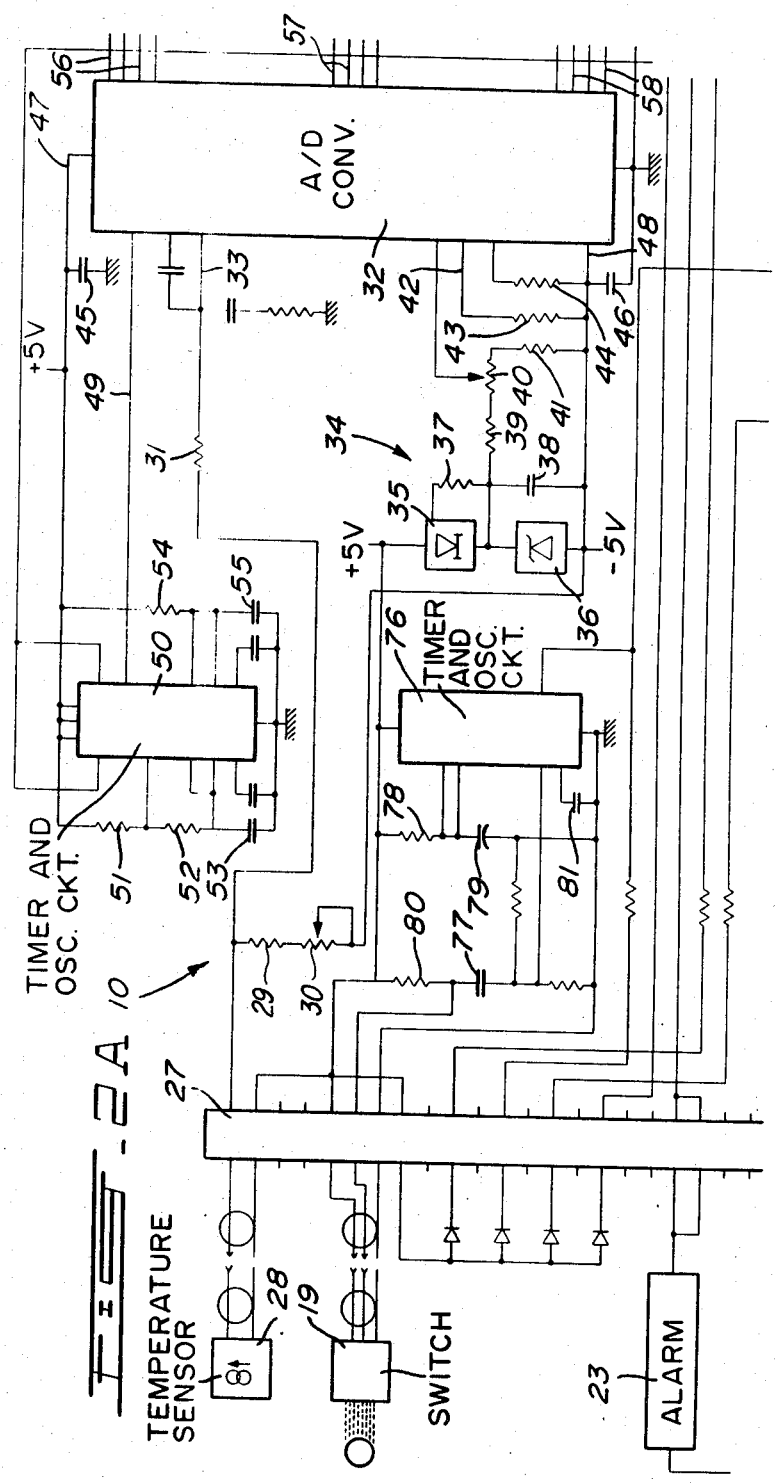

The alarm system 10 has a power input fed by a 120 volt AC circuit 20. A washing and vacuum device 17 and 17' also feed control signals to the system 10. The refrigeration device 13 also provides control signals to the system for monitoring the refrigeration device. Another feature of the alarm system of the present invention is that it can also receive one or more inputs which are adapted to be connected to smoke detectors 21. Whenever there is an alarm condition on any of the input connections the system will generate an alarm signal on its output line 22 and initiate an audible alarm device 23. Also the housing 24 has an LED display 25 on a front panel to provide a visual indication of the temperature of the liquid within the reservoir 12. Further, there is provided visual alarms, in the form of LED lamps 26 to indicate which of the devices is defective when an alarm is initiated.

Figure 2B:
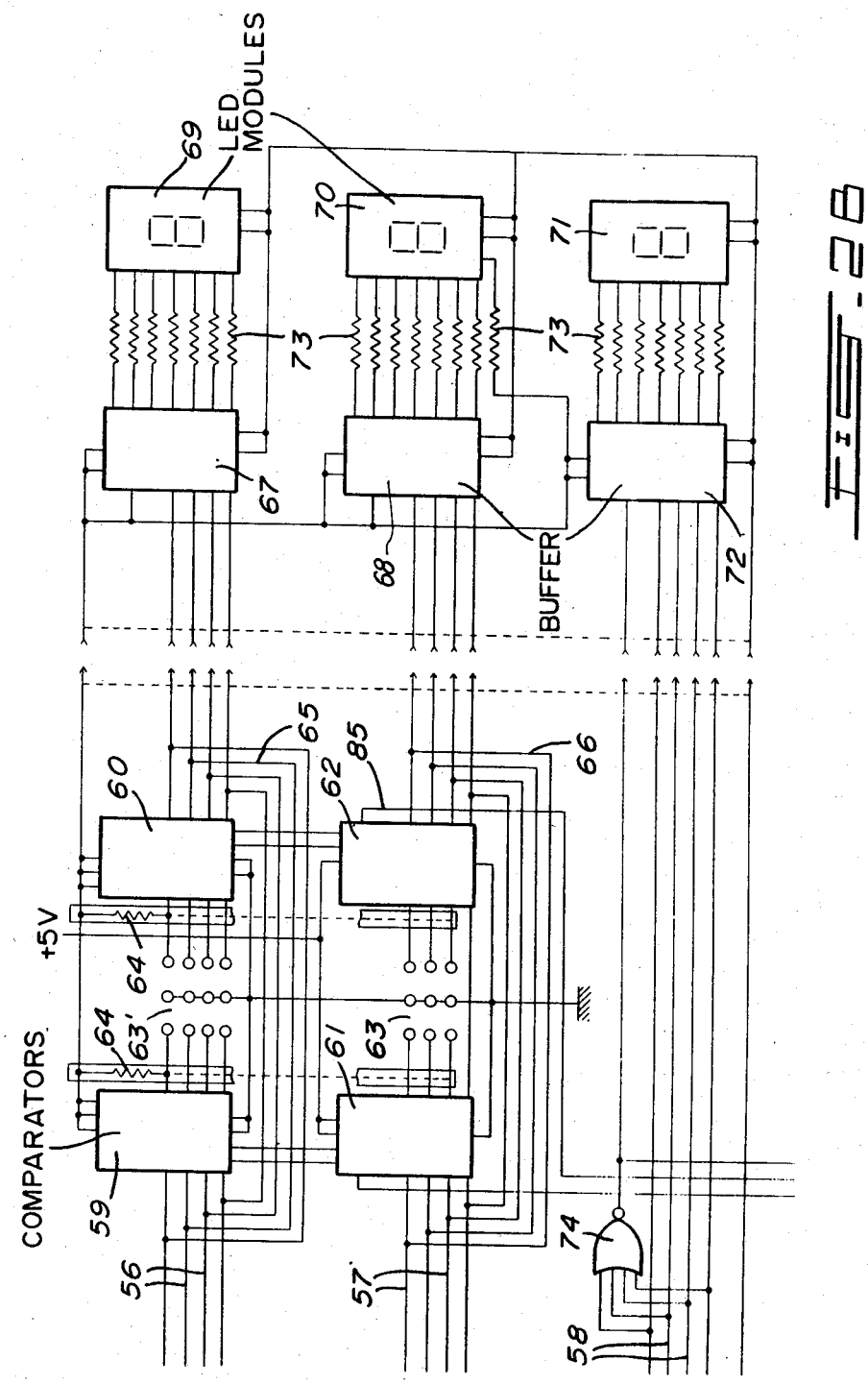

Referring now to FIGS. 2A-2D there will be described the construction and operation of the alarm system 10 of the present invention. All of the input and output connections of the system are made through a common bus bar 27. The temperature sensing probe 11 has a current generating circuit 28 which generates a temperature indicating signal representative of the liquid temperature. This signal is generated as a current expressed in microamps and the probe produces 1 microamp per Kelvin degree of temperature. As shown, the probe is connected to a calibration circuit which consists of resistor 29 connected in series with potentiometer 30 whereby the current signal is transformed into a voltage signal. The potentiometer 30 is used to calibrate the system and the output voltage signal is connected to a resistor 31 which limits the current to 10 microamps and feeds it to an analog/digital converter 32 where the analog signal is compared with a reference signal and produces a transformed binary output signal indicative of the temperature of the liquid.

The analog/digital converter circuit 32 is provided with an operational amplifier (not shown) which stabilizes the input signal and prevents oscillation or feedback. The analog signal on input 33 is the error signal and is compared to a reference voltage which is generated by a reference voltage signal circuit 34 which consists essentially of a variable current source 35 and a Zener diode 36. These components are not affected by temperature. The circuit 35 has a matching resistor 37 connected in parallel therewith and generates a 3 milliamp current signal output which is filtered by capacitor 38 and connected to a series connection of resistors 39, 40, and 41, which provide for the calibration of the reference signal. Resistor 40 is a potentiometer for fine adjustment of the reference signal voltage to precisely −5 volt DC appearing on the reference input connection 42. The −5 volt DC reference signal produces −25 microamps. Resistor 43 transforms the output of the reference voltage signal circuit 34 to approximately −5 volt DC.

The analog/digital converter circuit 32 processes the input signals and converts them into digital output signals within a time frame which is fixed by a delay circuit consisting of resistor 44. This time delay from input to output is determined in accordance with the following formula:

$$\text{Digital count} = \frac{V_{in} \times A \times R_{ref}}{R_{in} \times V_{ref}} = 12 \text{ millisecond}$$

where: $A = 4128$ $$R_{in}: \frac{V_{in} \text{ full scale}}{10 \text{ microAMPS}}$$

$$R_{ref}: \frac{R_{ref}}{-20 \text{ microAMPS}}$$

Capacitors 45 and 46 are bypass capacitors to filter the +5 volt and −5 volt supply voltages on input lines 47 and 48 respectively.

The converter is also fed a clock signal pulse at its input 49. This clock signal is generated by a timer/oscillator circuit 50 which generates a square wave output signal of 1 millisecond that is used to start the 12 millisecond conversion time of the analog/digital converter 32. The frequency of the output pulses is determined by resistors 51 and 52 and capacitor 53 and the pulse duration time is determined by resistor 54 and capacitor 55. The square wave signal generated by the timer/oscillator circuit 50 is also used to produce intermittent output signals for the alarm and has a duty cycle of 1.3 seconds in the ON mode and 0.7 seconds in the OFF mode.

The analog/digital converter 32 generates binary output signals which are converted from the millivolt input signals and representative of Celsius degrees which is the temperature sensed by the probe. The groups of output connections 56 and 57 indicate tens of degrees while the group of outputs at 58 indicate one-tenth of degrees. The output signals on the tens group of output lines 56, 57 feed comparator circuits 59, 60, 61, and 62 which are connected to limit switches 63 and 63′ which are used to preset the upper and lower limits of the temperature range which is acceptable for the liquid within the reservoir. When the binary signal value exceeds these limits an alarm will be triggered. These temperature limits prevent quality degradation of the milk contained within the reservoir. The comparators have a built-in logic truth table which needs not be disclosed in this application. Associated with the limit switches 63 and 63′ are bus resistors 64 that prevent current flow by floating input conditions and ensure a 5 volt DC on an open switch.

As can be seen the binary output groups of lines 56 and 57 also bypass the comparators through bypass lines 65 and 66 to input into 7-segment coding circuits 67 and 68 respectively. These circuits provide proper signals to associated LED modules 69 and 70 to indicate a number thereon indicative of the tens unit of temperature. The one-tenth LED module 71 is implemented directly from the output group of lines 58 through the coding circuit 72 to indicate the one-tenth of degree. The resistors 73 regulate the current to the LED modules. If the temperature is under 10° C., the first digit in LED module will be blank and this is achieved by the gate 74 and the inverter circuit 75 connected to this output. If the temperature is 10° C. or above, the NOR gate 74 will send a signal to the comparators 59 and 60 to generate an alarm.

If the binary output signals at the output of a converter 32 are under or above the two preset limits by the limit switches 63 and 63′, the output of the comparators will send an alarm signal to a gatecircuit and be validated by the converter circuit 32 and initiate the display of the temperature on the LED modules.

As previously mentioned, the liquid within the tank 12 is maintained agitated by a mixer or agitator device 14 which is motor-driven. A hall-effect switch 19 is energized by the condition of the switch contact. When there is an error signal generated by the position of the switch 19 a signal is sent to an electronic timer and oscillator circuit 76 to reset the timer. The capacitor 77 is connected into the circuit whereby to generate a one-shot signal to avoid a continuous signal if the motor shaft 18 stops with the magnet facing the hall-effect switch 19. The time of this alarm circuit is set at 3600 seconds plus or minus 10 percent. The combination of resistors 78 and capacitor 79 fixes this time. Resistor 80 is connected on a 5 volt DC supply to prevent current flow by a floating input. Capacitor 81 is a bypass capacitor to filter the supply voltage. If the timer/oscillator circuit 76 is not reset after 3600 seconds, the signal generated will light up the LED indicator 26′ on the housing 24 and will generate an audible alarm after being inverted by inverter 82 and connected to the gate 83. The alarm 23 is activated by the alarm activating circuit 84 to which is also fed the outputs 85 of the comparators 61 and 62 via NOR gate 86 indicating that the temperature limits have been exceeded.

The cooling circuit 13 and washing circuit 17 and the vacuum circuit 17′ are all connected to logic converter circuits 87 which are of identical construction whereby to convert 120 volt AC to 5 volt DC. One of these circuits will now be described and comprises a rectifier 88 whereby to cut off the negative part of the alternating current. Resistor 89 limits the voltage at 32 volt DC. Capacitor 90 provides a constant form for the 32 volt DC. Rectifier 91 is provided to saturate the transistor 92 at its base with 32 volt DC. Resistor 93 limits the voltage to 5 volt DC and prevents the current flow by a floating input. The gating circuit at the output of the transistor 92, namely gates 83 and 94, will have a signal from the wash cycle and vacuum cycle and refrigeration circuits, and produce an output signal to trigger an alarm and operate the display of LEDs 26 on the system housing 24. If the vacuum is OFF and the washing circuit OFF, gate 83′ will have a 0 output. If the vacuum circuit is ON and the washing circuit is OFF, that gate will still have a 0 output signal. If the vacuum circuit is OFF and the washing circuit is ON, the gate 83 will have a 1 output signal. If the vacuum circuit is OFF and the washing circuit comes back ON, the gate 83′ will stay at 1 and will be reset by a signal from the vacuum circuit. The inverter 95 at the output of the gate 83' provides an input to the other gate 94 that will be a 1 if both signals are 1.

A time sequencing circuit 96 is provided whereby to generate synch pulses which are adjustable and fed by a variable potentiometer 97 and capacitor 98. The number of minutes counted by the timer 96 is set by a switch 99. The signal from the vacuum circuit will trigger the timer 96 through resistor 100, capacitor 101, and resistor 102 which generate the trigger pulse. After the elapsed time the timer 96 will generate an output signal to gate 103 after a second elapsed time the timer 96 will generate an output signal to the gate 103 and will automatically reset.

The logic sequence for alarm start up is:

Alarm =

$$\overline{S_d + (H_z \times \overline{W} \times T_p \times T_2) + ((H_z \times \overline{W}) \times (M + \overline{C}) \times T_1)}$$

where:
- $T_h$ = high temperature 4° C. or 2° C.
- $T_1$ = timer $U_{18}$ (1 to 32 minutes)
- $T_2$ = timer $U_{18}$ (15 to 240 minutes)
- W = washing cycle (inverted by $U_{23}$)
- $S_d$ = smoke detector
- $H_z$ = frequency 0.5 $H_z$ or 2 sec. from 1st part of $U_3$
- M = mixer
- $\overline{C}$ = cooling system As previously described smoke detectors 21 are also connectible to the system and as herein shown the smoke detector circuit consists of resistor 104 connected to the arm 21 whereby to lower 9 volt DC voltage, common with these alarms to 0.7 volt DC whereby to energize transistor 105. The transistor 105 along with resistor 106 transforms the DC signal into a logic signal that is inverted by the inverter 107 and generate a continuous alarm signal. Capacitor 108 is provided to eliminate voltage variations.

It is within the ambit of the present invention to cover any obvious modifications of the example of the preferred embodiment described herein, provided such modifications fall within the scope of the appended claims.

We claim:

1. An alarm system for monitoring the temperature of milk contained in a reservoir, said system comprising a temperature sensing probe secured to said reservoir for sensing the temperature of said milk and connected to an input of said system, a sensing circuit associated with said probe to generate a temperature indicating analog signal representative of said milk temperature, a calibration circuit for calibrating said temperature signal relative to a reference signal, converter means to convert said calibrated temperature signal to a binary signal indicative of sensed temperatures of said milk to feed comparator circuits having preset limit detectors to initiate an alarm signal through an alarm circuit when said temperature binary signal exceeds a predetermined value, said comparator circuits feeding a display device to indicate the temperature of said milk, an agitator device in said reservoir, said agitator device being connected to a drive motor through a shaft, a bi-polar hall-effect switch associated with said shaft to monitor the state of said motor, said switch being energized by a magnet secured to said shaft, a timer/oscillator circuit associated with said switch whereby to generate an alarm signal to said alarm circuit after a predetermined time delay if said motor has not resumed its initial state, said converter means being an analog/digital converter, said calibration circuit having a reference voltage signal circuit which is connected to said converter to feed a fixed reference signal for comparison with said analog output signal of said calibration circuit and having a potentiometer to fix said reference signal, said converter further having three groups of output lines, two of said groups having signals indicative of tens of degrees and the third group having signals indicative of one-tenth of a degree, said groups of signals being associated with a respective light emitting diode, said two groups of signals indicative of tens of degrees being connected to said comparators which comprise four CMOS 4-bit magnitude comparators coupled with a limit switch to preset upper and lower temperature limits that will trigger an alarm signal to an alarm circuit when said limits are exceeded, comparators connected to two coding circuits associated with a respective one of said light emitting diodes, said third group of signals indicative of one-tenth of a degree being connected directly to a coding circuit associated with a further light emitting diode, said diodes providing a visual indication of the actual temperature of said liquid being monitored.

2. An alarm system as claimed in claim 1 wherein said temperature indicating signal is an analog signal expressed in microamps, said calibration circuit having an analog output signal expressed in voltage for calibrating said system.

3. An alarm system as claimed in claim 2 wherein said reference voltage signal circuit comprises a variable current source connected in series with a Zener diode, a resistor and series capacitor connected across said current source and diode to provide an output filtered voltage to feed a series connection of said potentiometer and other resistors.

4. An alarm system as claimed in claim 3 wherein a clock circuit is connected to said converter and comprises a timer and oscillator to generate a square wave to initiate a 1 μs pulse to operate the conversion function of said converter, said clock circuit also producing a duty cycle signal for an alarm circuit.

5. An alarm system as claimed in claim 1 wherein there is further provided a plurality of further monitoring devices connected to further inputs of said system to detect changes in associated equipment or environmental conditions, said further inputs being connected to a respective signal logic converter circuit to provide an alarm logic signal to said alarm circuit when an alarm condition is sensed, and a timer circuit to generate an alarm trigger pulse to activate said alarm circuit.

* * * * *